United States Patent
Higashi

(10) Patent No.: US 7,154,822 B2
(45) Date of Patent: Dec. 26, 2006

(54) OPTICAL DISC RECORDING CONTROL METHOD, DRIVE, AND RECORDING SYSTEM FOR RECORDING DATA IN A PRE-GAP, ALL TRACKS, A LEAD-OUT AREA, A LEAD-IN AREA, AND A PROGRAM MEMORY AREA

(75) Inventor: Masato Higashi, Matsuyama (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 540 days.

(21) Appl. No.: 10/129,319

(22) PCT Filed: Sep. 7, 2001

(86) PCT No.: PCT/JP01/07780

§ 371 (c)(1),
(2), (4) Date: Aug. 13, 2002

(87) PCT Pub. No.: WO02/21519

PCT Pub. Date: Mar. 14, 2002

(65) Prior Publication Data

US 2003/0021200 A1 Jan. 30, 2003

(30) Foreign Application Priority Data

Sep. 7, 2000 (JP) .............................. 2000-270857

(51) Int. Cl.
*G11B 20/10* (2006.01)
*G11B 5/09* (2006.01)

(52) U.S. Cl. ................................ 369/47.13; 369/59.25

(58) Field of Classification Search ............ 369/47.12, 369/47.13, 59.25, 30.05, 30.19
See application file for complete search history.

(56) References Cited

U.S. PATENT DOCUMENTS

| | | | | |
|---|---|---|---|---|
| 4,760,566 A | * | 7/1988 | Kobayashi et al. | 369/47.23 |
| 5,359,583 A | * | 10/1994 | Jung | 369/53.37 |
| 5,526,331 A | * | 6/1996 | Park et al. | 369/47.12 |
| 5,613,112 A | * | 3/1997 | Nagashima | 707/200 |
| 5,666,334 A | * | 9/1997 | Tokuyama et al. | 369/14 |
| 5,721,856 A | * | 2/1998 | Takeuchi | 711/1 |
| 5,796,684 A | * | 8/1998 | Yaegashi | 709/230 |
| 6,009,058 A | | 12/1999 | Simms, III et al. | |
| 6,052,346 A | * | 4/2000 | Arataki et al. | 369/47.54 |
| 6,147,949 A | * | 11/2000 | Yamagishi | 369/47.13 |

(Continued)

FOREIGN PATENT DOCUMENTS

EP 399853 A2 * 11/1990

(Continued)

*Primary Examiner*—William J Klimowicz
(74) *Attorney, Agent, or Firm*—Wenderoth, Lind & Ponack, L.L.P.

(57) ABSTRACT

According to an optical disc recording control method, a drive, and a recording system of the present invention, in a drive of an optical disc, when data transfer from a host computer is interrupted while data transmitted from the host computer is being recorded in a track of the disk, the recording in the track is stopped and the recording process is switched to record data in a lead-out area, and when the recording process for the lead-out area is ended, track information (TOC data and PMA data) from the first track up to the last track is modified in accordance with the track data which has been actually recorded on the disk, and the modified track information is recorded in a lead-in area and a PMA.

4 Claims, 12 Drawing Sheets

U.S. PATENT DOCUMENTS

| | | | |
|---|---|---|---|
| 6,330,215 B1 * | 12/2001 | Lim | 369/53.2 |
| 6,333,904 B1 * | 12/2001 | Hashimoto | 369/53.44 |
| 6,335,910 B1 * | 1/2002 | Yoshizawa et al. | 369/53.18 |
| 6,614,729 B1 * | 9/2003 | Griner et al. | 369/1 |
| 6,628,602 B1 * | 9/2003 | Ohno et al. | 369/275.3 |

FOREIGN PATENT DOCUMENTS

| | | | |
|---|---|---|---|
| GB | 2327292 A * | 1/1999 | |
| JP | 03-268286 | 11/1991 | |
| JP | 04351774 A * | 12/1992 | |
| JP | 05-101544 | 4/1993 | |
| JP | 08138352 A * | 5/1996 | |
| JP | 08-180411 | 7/1996 | |
| JP | 10-320925 | 12/1998 | |
| JP | 07-312012 | 1/1999 | |
| JP | 11-16248 | 1/1999 | |
| JP | 11039844 A * | 2/1999 | |
| JP | 11-86292 | 3/1999 | |
| JP | 2000-149433 | 5/2000 | |

* cited by examiner

Fig.6

|  | CTL/ADR | TNO | INDEX | DATA FORM | SCMS | ABSOLUTE TIME |  |  |
|---|---|---|---|---|---|---|---|---|
|  |  |  |  |  |  | MIN | SEC | FRAME |
| Lead-in | 01h | 00h | 00h | 01h | 00h | 00h | 00h | 00h |
| Track 1 | 01h | 01h | 00h | 00h | 00h | 00h | 00h | 00h |
| Track 1 | 01h | 01h | 01h | 00h | 00h | 00h | 02h | 00h |
| Track 2 | 01h | 02h | 01h | 00h | 00h | 03h | 02h | 00h |
| Track 3 | 01h | 03h | 01h | 00h | 00h | 06h | 05h | 00h |
| Track 4 | 01h | 04h | 01h | 00h | 00h | 0ah | 10h | 00h |
| Track 5 | 01h | 05h | 01h | 00h | 00h | 10h | 10h | 00h |
| Lead-out | 01h | aah | 01h | 01h | 00h | 13h | 15h | 00h |

Fig.7

| AD/CTL | TNO | PONT | MIN | SEC | FRM | ZERO | PMIN | PSEC | PFRM |
|--------|-----|------|-----|-----|-----|------|------|------|------|
| 10 | 00 | A0 | 00 | 00 | 00 | 00 | 01 | 00 | 00 |
| 10 | 00 | A1 | 00 | 00 | 00 | 00 | 05 | 00 | 00 |
| 10 | 00 | A2 | 00 | 00 | 00 | 00 | 13 | 15 | 00 |
| 10 | 00 | 01 | 00 | 00 | 00 | 00 | 00 | 02 | 00 |
| 10 | 00 | 02 | 00 | 00 | 00 | 00 | 03 | 02 | 00 |
| 10 | 00 | 03 | 00 | 00 | 00 | 00 | 06 | 05 | 00 |
| 10 | 00 | 04 | 00 | 00 | 00 | 00 | 0A | 10 | 00 |
| 10 | 00 | 05 | 00 | 00 | 00 | 00 | 10 | 10 | 00 |

Fig.8

| AD/CTL | TNO | PONT | MIN | SEC | FRM | ZERO | PMIN | PSEC | PFRM |
|---|---|---|---|---|---|---|---|---|---|
| 10 | 00 | A0 | 00 | 00 | 00 | 00 | 01 | 00 | 00 |
| 10 | 00 | A1 | 00 | 00 | 00 | 00 | 03 | 00 | 00 |
| 10 | 00 | A2 | 00 | 00 | 00 | 00 | 0A | 10 | 00 |
| 10 | 00 | 01 | 00 | 00 | 00 | 00 | 00 | 02 | 00 |
| 10 | 00 | 02 | 00 | 00 | 00 | 00 | 03 | 02 | 00 |
| 10 | 00 | 03 | 00 | 00 | 00 | 00 | 06 | 05 | 00 |

Fig.9

| AD/CTL | TNO | PONT | MIN | SEC | FRM | ZERO | PMIN | PSEC | PFRM |
|---|---|---|---|---|---|---|---|---|---|
| 10 | 00 | A0 | 00 | 00 | 00 | 00 | 01 | 00 | 00 |
| 10 | 00 | A1 | 00 | 00 | 00 | 00 | 03 | 00 | 00 |
| 10 | 00 | A2 | 00 | 00 | 00 | 00 | 0A | 10 | 00 |
| 50 | 00 | B0 | 0C | 2E | 00 | 02 | 4A | 2B | 00 |
| 50 | 00 | C0 | 80 | 00 | 00 | 00 | 61 | 18 | 01 |
| 10 | 00 | 01 | 00 | 00 | 00 | 00 | 00 | 02 | 00 |
| 10 | 00 | 02 | 00 | 00 | 00 | 00 | 03 | 02 | 00 |
| 10 | 00 | 03 | 00 | 00 | 00 | 00 | 06 | 05 | 00 |

OPTICAL DISC RECORDING CONTROL METHOD, DRIVE, AND RECORDING SYSTEM FOR RECORDING DATA IN A PRE-GAP, ALL TRACKS, A LEAD-OUT AREA, A LEAD-IN AREA, AND A PROGRAM MEMORY AREA

This application is a 371 of PCT/JP01/07780 Sep. 7, 2001

TECHNICAL FIELD

The present invention relates to a method for controlling recording on writable optical discs such as CD-R (Compact Disc-Recordable) discs and CD-WR (Compact Disc-ReWritable) discs, drives for optical discs, such as CD-R drives and CD-WR drives, and recording systems which record data simultaneously on plural optical discs.

BACKGROUND ART

Among drives for recording/reproducing data on/from optical discs, some drives applicable to CD-R discs or CD-RW discs (hereinafter, abbreviated as "discs") adopt a Disc At Once recording method as their recording methods.

When a CD-R/RW drive (hereinafter, abbreviated as "drive") records data transmitted from a host computer by the Disc At Once recording method, the drive initially records data in a lead-in area of an optical disc, then records data in at least one track, and finally records data in a lead-out area. This recording process must be performed at a time and without interruption from the lead-in area through the track to the lead-out area.

Further, a CD duplication system for recording data simultaneously on plural optical discs is constituted by 2 to 10 drives and a control unit for controlling recording and reproduction of these drives.

In this system, the Disc At Once recording process must be carried out simultaneously in all the drives so that one piece of original data is simultaneously recorded on the plural discs by the plural drives.

In this Disc At Once recording method, the drive cannot stop the recording operation for the disc in the middle. Therefore, when the rate of data transfer from the host computers is low, there are cases where buffer under-run occurs and transfer data are broken in process of recording, whereby the recording operation is suspended. At this time, TOC (Table Of Contents) data as an information list of data is already recorded in the lead-in area of the disc. The state of the TOC data and the state of track data in which the transfer data has been broken in process of recording are different from each other, resulting in an improper disc, whereby the data reproduction therefrom becomes impossible.

Further, the CD duplication system has following problems.

In the case of CD-R/RW discs, start time of the lead-in area (hereinafter, referred to as "lead-in area start time") is changed so as to identify the type of the disc. The numeric value of this lead-in area start time is previously recorded on the disc as ATIP (Absolute Time in Pre-groove) data which is information indicating time and other properties of the disc. For example, there are a disc with the lead-in area start time of 97:24:01 and a disc with the lead-in area start time of 97:34:21. The length of the lead-in area of the former disc is 97:24:01 to 99:59:74 and the length of the lead-in area of the latter is 97:34:21 to 99:59:74. The discs having the different lead-in area start times have different lengths of the lead-in areas, and thus it is impossible to perform simultaneous recording by the Disc At Once recording method.

In addition, there is a problem as to recording speed resulting from variations in the disk type. The CD-RW discs have limited recording speeds. For example, there are a disc exclusively for double speed, a disc for a range of single to quadruple speeds, a disk for a range of quadruple to 12× speeds, and the like. When discs with different recording speed ranges are mixed, simultaneous recording by the Disc At Once recording method cannot be performed.

Accordingly, in order to perform simultaneous recording on the plural discs in the CD duplication system, a large number of discs with the same lead-in area start time and recording speed range should be prepared.

The present invention is made to solve the above-mentioned problems and has for its object to provide an optical disc recording control method and a drive for creating an optical disc that is reproducible even when an error occurs while data is recorded in a track of the optical disc and then the recording process is suspended, and an optical disc recording system which simultaneously performs recording on different types of optical discs.

DISCLOSURE OF THE INVENTION

According to the present invention, there is provided an optical disc recording control method by which data which is to be included in at least one track, a lead-in area, and a lead-out area of an optical disc is collectively recorded, comprising: starting to record data from a pre-gap in a first track at an inner radius of the optical disc, continuously recording data in all the tracks and the lead-out area, and thereafter recording data in the lead-in area and a program memory area which are located at the inner radius of the first track.

In the optical disc recording control method so structured, contents of TOC recorded in the lead-in area can be edited in accordance with the data which has been actually recorded in a track, whereby a reproducible optical disc can be created.

According to the present invention, in the optical disc recording control method when an error occurs and the recording process is suspended while data is being recorded in the track of the optical disc, the recording process is switched to record data in the lead-out area, and after the recording in the lead-out area is ended, track information for reading the track data from the optical disc is modified in accordance with the track data which has been actually recorded on the optical disc, and the modified track information is recorded in the lead-in area and the program memory area.

In the optical disc recording control method so structured, even when the recording process is suspended, contents of the track information (TOC data and program memory area data) recorded in the lead-in area and the program memory area can be edited in accordance with the track data which has been actually recorded on the optical disc, whereby a reproducible optical disc can be created.

According to the present invention, in the optical disc recording control method when an error occurs and the recording process is suspended while data is being recorded in the track of the optical disc, the recording process is switched to record data in the lead-out area, and after the recording in the lead-out area is ended, track information for reading track data from the optical disc is modified in accordance with the track data which has been actually recorded on the optical disc, and the modified track information is recorded in the lead-in area and the program memory area, as well as multi-session information which enables additional recording on the optical disc is recorded in the lead-in area.

In the optical disc recording control method so structured, even when the recording process is suspended, contents of the track information (TOC data and program memory area data) recorded in the lead-in area and the program memory area can be edited in accordance with the track data which has been actually recorded on the optical disc, whereby a reproducible optical disc can be created. Further, additional recording on the optical disc is enabled, thereby effectively utilizing the optical disc.

According to the present invention, there is provided an optical disc recording control method by which a device for writable optical disc selects either a Disc At Once recording method for recording data received from an external device in a lead-in area, tracks, a lead-out area, and a program memory area of an optical disc sequentially, or a second recording method for recording data in tracks, a lead-out area, a lead-in area, and a program memory area of an optical disc sequentially, and when the drive of the optical disc receives a command instructing the Disc At Once recording method from the external device, the drive selects whether the Disc At Once recording method or the second recording method is to be used.

In the optical disc recording control method so structured, the optical disc drive can record data by the best suited recording method according to the format of data which is received from an external device or the like. Further, there is no need to create new software on the host computer side in order to execute the second recording method, and conventional software for the Disc At Once recording method can be used as it is, thereby maintaining compatibility.

According to the present invention, there is provided an optical disc recording control method by which data is recorded on plural optical discs simultaneously by either a Disc At Once recording method for recording data in a lead-in area, tracks, a lead-out area, and a program memory area of an optical disc sequentially, or a second recording method for recording data in tracks, a lead-out area, a lead-in area, and a program memory area of an optical disc sequentially, comprising: reading lead-in area start times recorded in ATIP (Absolute Time in Pre-groove) of the plural optical discs, judging whether the lead-in area start times of all the optical discs are the same or not, and when the lead-in area start times of all the disks are the same, selecting the Disc At Once recording method, while when there exists an optical disc with a different lead-in area start time, selecting the second recording method.

In the optical disc recording control method so structured, even when optical discs with different lead-in area start times are mixed, simultaneous recording of data on plural optical discs is possible, thereby effectively recording data even on a large number of optical discs.

According to the present invention, the optical disc recording control method includes reading information that defines recording speed ranges, which is recorded in the ATIP of the plural optical discs, judging whether or not there exists a common speed in recording speed ranges of all the optical discs, and when there is a common speed, deciding the common speed as a recording processing speed for all the optical discs, while when there is no common speed, not performing the recording process on all the optical discs.

In the optical disc recording control method so structured, even when plural optical discs with different lead-in area start times or recording processing speed ranges are mixed, simultaneous recording of data on the plural optical discs is possible, thereby effectively recording data even on a large number of optical discs.

According to the present invention, there is provided an optical disc drive for collectively recording data which is to be included in at least one track, a lead-in area, and a lead-out area of an optical disc, comprising: a track data recording means for starting to record data from a pre-gap of a first track at an inner radius of the optical disc, and recording data in all the tracks; a lead-out area recording means for recording data in the lead-out area continuously after the data is recorded in all the tracks; and a track information recording means for recording track information for reading the track data recorded on the optical disc, in the lead-in area and a program memory area which are located at the inner radius of the first track, after the data is recorded in the lead-out area.

In the optical disc drive so configured, contents of TOC recorded in the lead-in area can be edited in accordance with the data which has been actually recorded in a track, whereby a reproducible optical disc can be created.

According to the present invention, the optical disc drive further includes: a switching means for switching the recording process to record data in the lead-out area when an error occurs and the recording process is suspended while the track data is being recorded by the track data recording means; a track information modification means for modifying the track information on all track data in accordance with the track data which has been actually recorded on the optical disc, after the recording process for the lead-out area by the lead-out area recording means is completed; and a second track information recording means for recording the track information modified by the track information modification means in the lead-in area and the program memory area.

In the optical disc drive so configured, even when the recording process is suspended, contents of the track information (TOC data and program memory area data) recorded in the lead-in area and the program memory area can be edited in accordance with the track data which has been actually recorded on the optical disc, whereby a reproducible optical disc can be created.

According to the present invention, the optical disc drive further includes: a switching means for switching the recording process to record data in the lead-out area when an error occurs and the recording process is suspended while the track data is being recorded by the track data recording means; a track information modification means for modifying the track information on all track data in accordance with the track data which has been actually recorded on the optical disc, after the recording process for the lead-out area by the lead-out area recording means is completed; a second track information recording means for recording the track information modified by the track information modification means in the lead-in area and the program memory area; and a multi-session information recording means for recording multi-session information which enables additional recording on the optical disc, in the lead-in area, while simultaneously the second track information recording means is recording the track information in the lead-in area and the program memory area.

In the optical disc drive so configured, even when the recording process is suspended, contents of the track information (TOC data and program memory area data) recorded in the lead-in area and the program memory area can be edited in accordance with the track data which has been actually recorded on the optical disc, whereby a reproducible optical disc can be created. Further, additional recording on the optical disc is enabled, thereby effectively utilizing the optical disc.

According to the present invention, there is provided a writable optical disc drive comprising: a first recording means for recording data by a Disc At Once recording method by which data is recorded in a lead-in area, tracks, a lead-out area, and a program memory area of an optical disc sequentially; a second recording means for recording data by a second recording method by which data is recorded in tracks, a lead-out area, a lead-in area, and a program memory area of an optical disc sequentially; and a selection means for selecting the Disc At Once recording method or the second recording method to record data on the optical disc, when the drive receives a command instructing the Disc At Once recording method from an external device.

According to the optical disc drive so configured, the optical disc drive can record data by the best suited recording method according to the format of data which is received from the external device. Further, there is no need to create new software on the host computer side in order to execute the second recording method, and conventional software for the Disc At Once recording method can be used as it is, thereby maintaining compatibility.

According to the present invention, there is provided an optical disc recording system which comprises plural optical disc drives and a controller for controlling recording and reproduction of the plural drives, simultaneously transfers data which is to be recorded on optical discs, from the controller to the plural drives, and performs simultaneous recording on the optical discs in all the drives, and the drive comprises: a first recording means for recording data by a Disc At Once recording method by which data is recorded in a lead-in area, tracks, a lead-out area, and a program memory area of an optical disc sequentially; and a second recording means for recording data by a second recording method by which data is recorded in tracks, a lead-out area, a lead-in area, and a program memory area of an optical disc sequentially, the controller comprises: a reading means for reading lead-in area start times recorded in ATIP (Absolute Time in Pre-groove) of the plural optical discs which are inserted in the plural drives; a judging means for judging whether the lead-in area start times of the optical discs which are read by the reading means are all the same or not; and a selection means for selecting the Disc At Once recording method when the judging means judges that the lead-in area start times of all the optical discs are the same, and selecting the second recording method when the judging means judges that there exists an optical disc with a different lead-in area start time, and all the drives perform simultaneous recording on the optical discs according to the recording method selected by the controller.

In the optical disc recording system so configured, even when optical discs with different lead-in area start times are mixed, simultaneous recording of data on plural optical discs is enabled, thereby effectively recording data even on a large number of optical discs.

According to the present invention, in the optical disc recording system, the controller comprises: a recording speed reading means for reading information that defines recording speed ranges, which is recorded in the ATIP of the plural optical discs inserted in the plural drives; a judging means for judging whether there exists a common speed in the recording speed ranges of the plural optical discs, which are read by the recording speed reading means; and a decision means for deciding the common speed as a recording processing speed for all the optical discs when the judging means judges that the common speed exists in the recording speed ranges of all the optical discs, and deciding not to perform the recording process on all the optical discs when the judging means judges that no common speed exists.

In the optical disc recording system so configured, even when disc with different lead-in area start times or recording processing speed ranges are mixed, simultaneous recording of data on plural optical discs is possible, thereby effectively recording data even on a large number of optical discs.

According to the present invention, in the optical disc recording system, the controller comprises: a recording speed reading means for reading information that defines recording speed ranges, which is recorded in the ATIP of the plural optical discs inserted in the plural drives; a judging means for judging whether there exists a common speed in the recording speed ranges of the plural optical discs, which are read by the recording speed reading means; a decision means for deciding the common speed as a recording processing speed for all the optical discs when the judging means judges that the common speed exists in the recording speed ranges of all the optical discs, and deciding not to perform the recording process on all the optical discs when the judging means judges that no common speed exists; and a display device which displays an error message when the judging means judges that no common speed exists in the recording speed ranges of all the optical discs.

In the optical disc recording system so configured, it is possible to inform a user of inability of recording by an error display on the display device, thereby preventing failure in recording.

BRIEF DESCRIPTION OF DRAWINGS

FIG. 6 is a diagram for explaining a Cue Sheet for reading the track data recorded on an optical disc according to the first embodiment of the invention.

FIG. 7 is a diagram for explaining TOC data which is created from the Cue Sheet in FIG. 6 according to the first embodiment of the invention.

FIG. 8 is a diagram for explaining TOC data which is created by the recording method C according to the first embodiment of the invention.

FIG. 9 is a diagram for explaining TOC data to which multi-session information is added in the first embodiment of the invention.

BEST MODE TO EXECUTE THE INVENTION

Embodiment 1

A first embodiment of the present invention will be described with reference to FIGS. 1 to 9.

Figure 1:
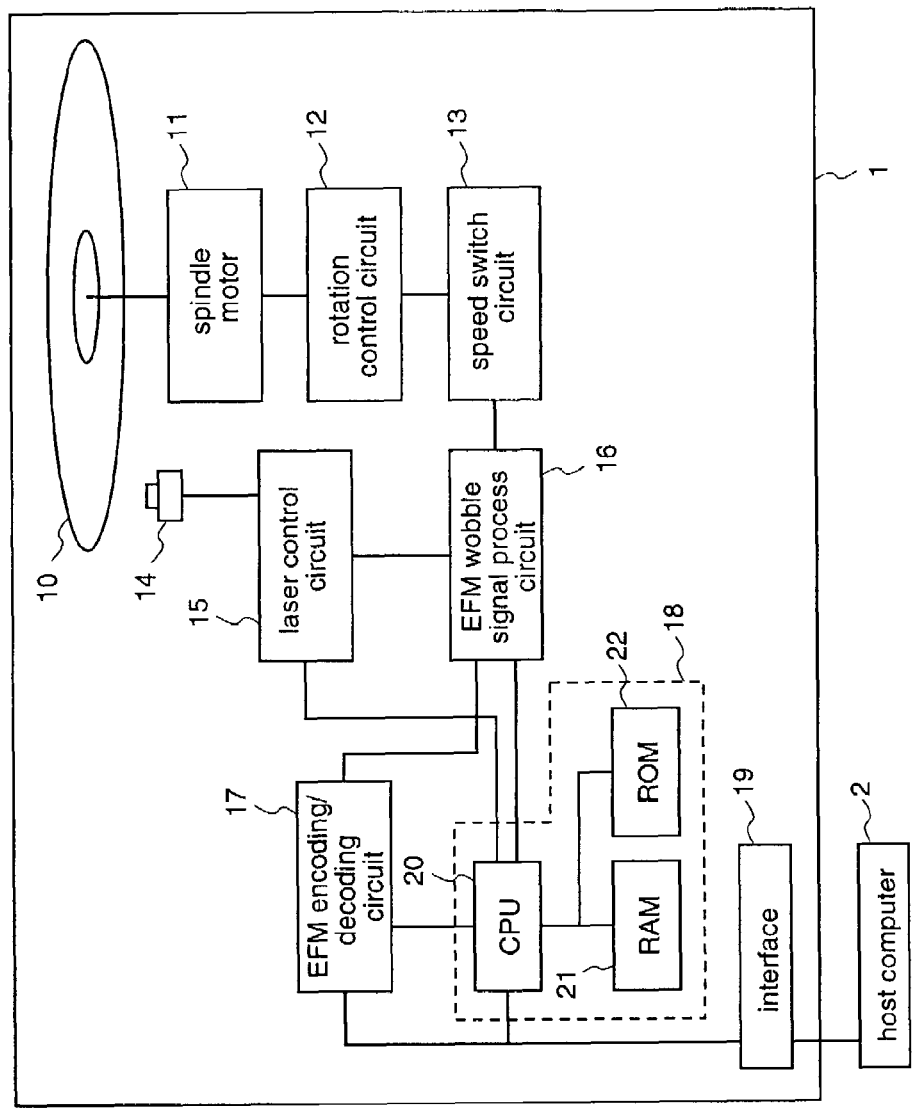
FIG. 1 is a block diagram illustrating the structure of a drive according to a first embodiment of the present invention.

FIG. 1 is a block diagram illustrating the structure of a drive for an optical disc according to the first embodiment of the present invention.

A drive 1 comprises a spindle motor 11, a rotation control circuit 12, a speed switch circuit 13, an optical pickup 14, a laser control circuit 15, an EFM wobble signal process circuit 16, an EFM encoding/decoding circuit 17, a control part 18, and an interface 19.

The spindle motor 11 supports a disk 10 and rotates the same. The rotation of the disk 10 is controlled by the rotation control circuit 12 and the speed switch circuit 13. The optical pickup 14 applies a laser beam to a track of the disk 10 to perform recording/reproduction of data. The laser control circuit 15 controls the laser of the optical pickup 14 so as to have a recording power at data recording, and controls the laser of the optical pickup 14 so as to have a reproduction power at data reproduction.

The EFM wobble signal process circuit 16 outputs a signal which is obtained by amplifying a reflected light signal that is detected from the disk 10 by the optical pickup 14 and then reproducing the reflected light signal, at the reproduction of the disk 10, or a wobbling signal which is detected from a pre-groove formed on the disk 10. Here, time information (as will hereinafter be described in detail) referred to as ATIP (Absolute Time in Pre-groove) is obtained by the wobbling signal.

The EFM encoding/decoding circuit 17 modulates data to be recorded, which is inputted from a host computer 2 through the interface 19, in a prescribed format, or demodulates data to be reproduced or the wobbling signal inputted from the EFM wobble signal process circuit 16.

The control part 18 that performs control over the above-described respective constituents is constituted by a CPU 20, a ROM 22 which contains a control program, and a RAM 21 which is a working area of the CPU 20.

Figure 2:
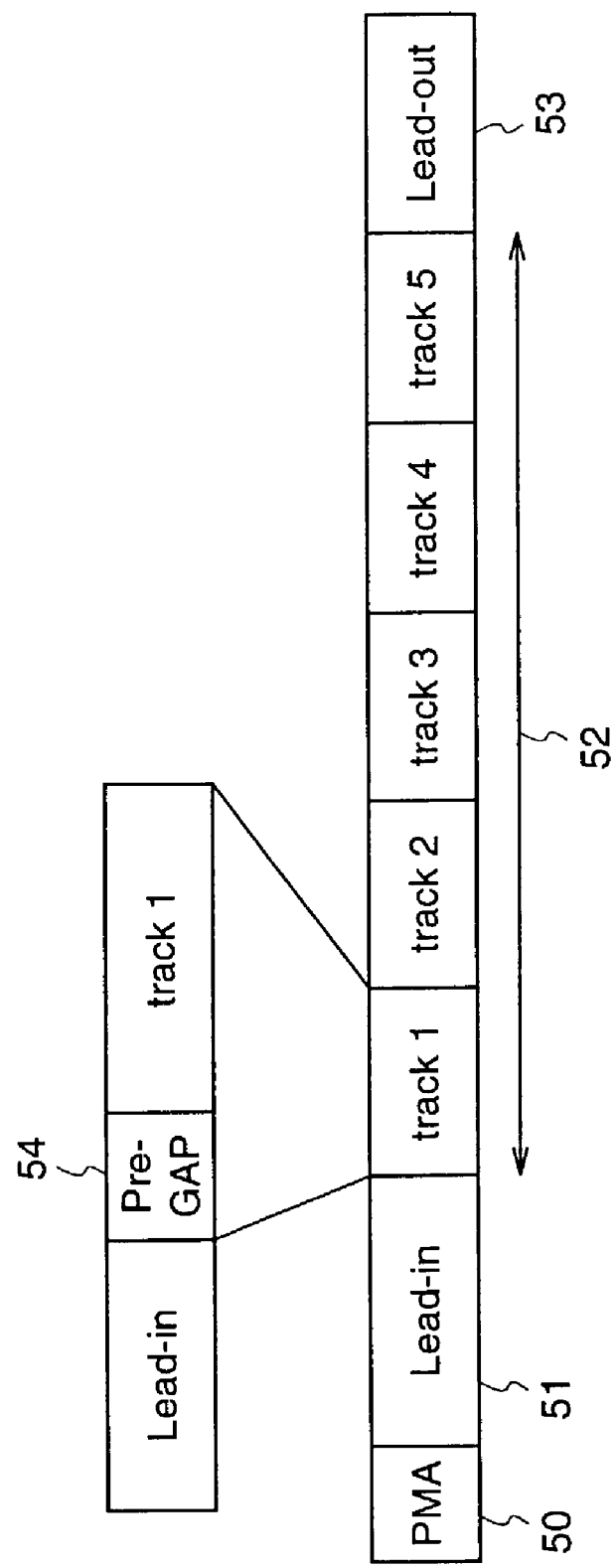
FIG. 2 is a schematic diagram showing an example of a format of a CD-R/RW disc according to the first embodiment of the invention.

FIG. 2 is a diagram schematically showing an example of a format of a CD-R/RW disc.

In this figure, numeral 50 denotes a PMA (Program Memory Area) which is a program memory area in the disk 10. In the disk 10, tracks 52 are data writing areas, which are divided into tracks 1 to 5. A lead-in area (Lead-in) 51 and a lead-out area (Lead-out) 53 are located at an inner radius and an outer radius with respect to the track 52 area, respectively. There is a pre-gap (Pre-GAP) 54 at the head of the track 1, which provides a break in data between effective data recorded in the lead-in area 51 and data recorded in the track 1.

First, a Disc At Once recording method A (first recording method) according to the prior art will be described with reference to FIGS. 1 to 3, 6, and 7.

Figure 3:
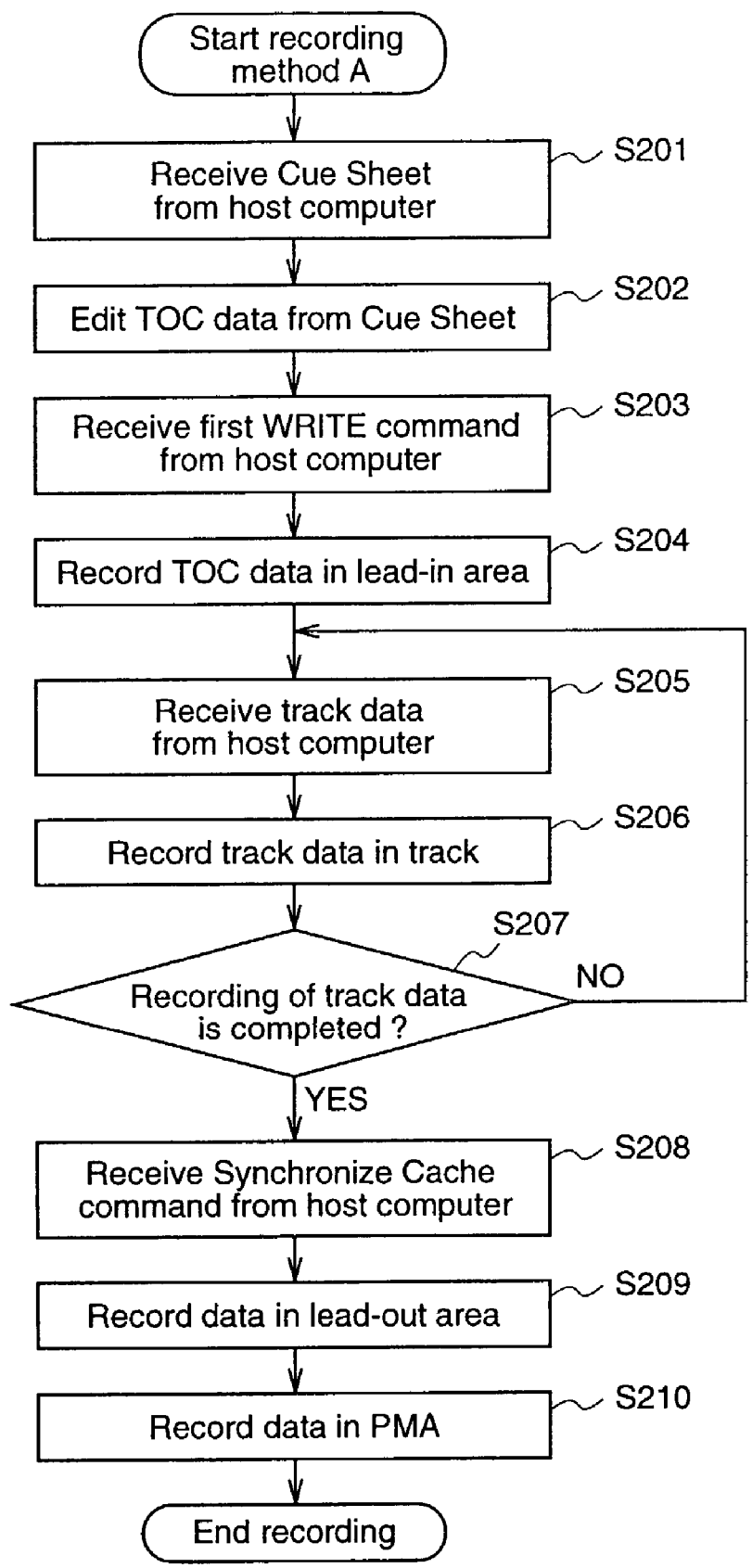
FIG. 3 is a flowchart for explaining a conventional Disc At Once recording method A.

Hereinafter, a description will be given of the operation of the drive according to the first embodiment in a case where the drive records information having the format shown in FIG. 2 by the Disc At Once recording method A. FIG. 3 is a flowchart for explaining the Disc At Once recording method A.

In the drive 1, when data is to be recorded on the disk 10, the data to be recorded, which is inputted from the host computer 2, is modulated by the EFM encoding/decoding circuit 17 under the control of the control part 18, and the recording process is performed by a laser of the optical pickup 14. In the following flow, a detailed description of the recording process will be omitted.

First, in step S201, the drive 1 receives a CUE SHEET as shown in FIG. 6 from the host computer 2, together with a SEND CUE SHEET command defined by SCSI-3 MMC. When various main data such as voice, pictures, and characters are recorded on the disk 10, control data that is used for reading those main data is also recorded simultaneously. The Cue Sheet in FIG. 6 shows the control data. The SCSI-3 MMC command is command information concerning the CD-R/RW disc that is standardized by ANSIX3T10.

In FIG. 6, higher 4 bits of CTL/ADR indicate data that is recorded in CONTROL of sub-channel Q of each track, and lower 4 bits indicate data that is recorded in ADR of the sub-channel Q of each track. TNO indicates a track number of the sub-channel Q of each track. INDEX indicates an index number of the sub-channel Q of each track. DATA FORM indicates a format of each track. SCMS indicates Serial Copy Management System. MIN, SEC, and FRAME of ABSOLUTE TIME indicate start time of each track. An upper one of two tracks 1 indicates a format of data recorded in the Pre-GAP 54 and the lower track 1 indicates a format of the effective data in the track 1.

Next, when the drive 1 receives the Cue Sheet from the host computer 2, the drive 1 edits TOC (Table Of Contents) data shown in FIG. 7 from the Cue Sheet at the control part 18 (step S202). After editing the TOC data, the drive 1 receives the first WRITE command which is issued by the host computer 2 (step S203), and records the edited TOC data in the lead-in area 51 (step S204).

When the recording of the TOC data is completed, track data which is successively transmitted from the host computer 2 according to the WRITE command is recorded in each area of the track 52 (steps S205 and 206).

When recording of all the track data transmitted from the host computer 2 is completed (step S207), the drive 1 receives a Synchronize Cache command simultaneously issued by the host computer 2 (step S208), and records data in the lead-out area 53 subsequently to the track data (step S209).

Finally, the drive 1 performs seeking toward the inner radius of the disk 10 to record PMA data in the PMA 50 (step S210), and a series of recording processes according to the Disc At Once recording method A are completed. Here, the PMA data is data for restoring the TOC data to the Cue Sheet.

Figure 4:
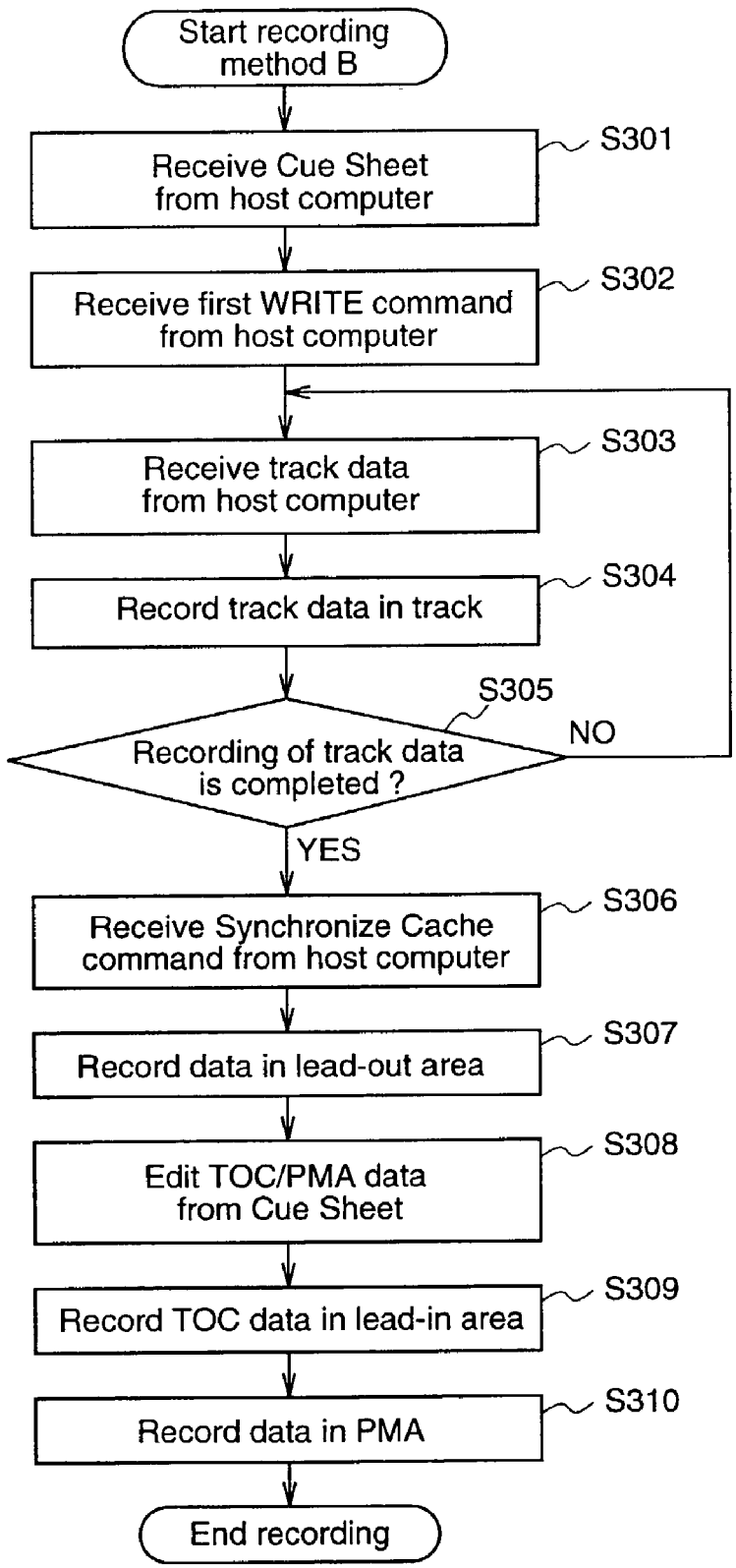
FIG. 4 is a flowchart for explaining a recording method B according to the first embodiment of the invention.

In contrast to the Disc At Once recording method A, a recording method B (second recording method) according to the present invention will be described with reference to FIG. 4. FIG. 4 is a flowchart for explaining the recording method B according to the first embodiment of the present invention.

In step S301, the Cue Sheet shown in FIG. 6 is transferred from the host computer 2 to the drive 1.

At a timing at which the first WRITE command is issued by the host computer 2 (step S302), the drive 1 starts recording of track data, and records successively transmitted track data in each track 52 (steps S303 and S304). When recording of all the track data is completed (step S305), the drive 1 receives a Synchronize Cache command from the host computer 2 (step S306) and records data in the lead-out area 53 subsequently to the track data (step S307).

Finally, the drive 1 edits the TOC data shown in FIG. 7 and PMA data (not shown) from the Cue Sheet by the control part 18 (step S308), performs seeking toward the inner radius of the disk 10 so as to record the TOC data in the lead-in area 51 (step S309), and record the PMA data in the PMA 50 (step S310).

In the above-mentioned Disc At Once recording method A and recording method B, the processing operations are the same when comparing these operations from the standpoint of the host computer 2 for issuing the commands, and therefore the same recording process program can be employed at the host computer 2 in both of the recording methods.

On the other hand, on the drive 1 side, when the drive 1 receives a command indicating the Disc At Once recording method A from the host computer 2, it can selectively carry out either the Disc At Once recording method A or the recording method B.

For example, in the case of recording RAW format data, where both of data to be recorded in the lead-in area 51 and track data are transferred from the host computer 2, it is difficult to perform recording of data in the lead-in area 51 separately, and thus the drive 1 selects the conventional Disc At Once recording method A. In cases of other formats, the data for the lead-in area 51 is generated by the drive 1 itself and recorded. Therefore, it is possible to perform recording of data in the lead-in area 51 separately, and thus the recording method B according to the present invention is selected.

As described above, the drive 1 according to the present invention can recognize a format of data to be record and select the best suited recording method. Moreover, there is no need to create new software on the host computer side in order to carry out the recording method B, and conventional software for the Disc At Once recording method can be employed as it is.

When comparing the disk 10 containing data recorded by the Disc At Once recording method A with the disk 10 containing data recorded by the recording method B, on the disk 10 according to the Disc At Once recording method A, data is continuously recorded from the lead-in area 51 through the tracks 52 to the lead-out area 52, whereby no break is produced in data. On the other hand, on the disk 10 according to the recording method B, there occurs a break in data between the lead-in area 51 and the head of the track 1. However, the Pre-GAP 54 area always exists at the head of the track 1 as shown in FIG. 2, and thus there is always the break in data where no effective data exists, at the connection between the lead-in area 51 and the track 52, regardless of which recording method is employed. Furthermore, both of the disks 10 which are created by the Disc At Once recording method A and the recording method B have no break in data from the effective data section of the track 1 to the lead-out area 53, so that the same reproduction results can be obtained at the reproduction. Therefore, the recording quality of the disk 10 containing data that is recorded by the recording method B according to the present invention is the same as the recording quality that is obtained by the conventional Disc At Once recording method A.

Moreover, in the recording method B according to the present invention, since the TOC data and the PMA data can be edited after data is recorded in the track 52 and the lead-out area 53, the TOC data and the PMA data are not fixed to the Cue Sheet which the drive 1 has first received from the host computer 2, and can be reedited during the data recording.

Figure 5:
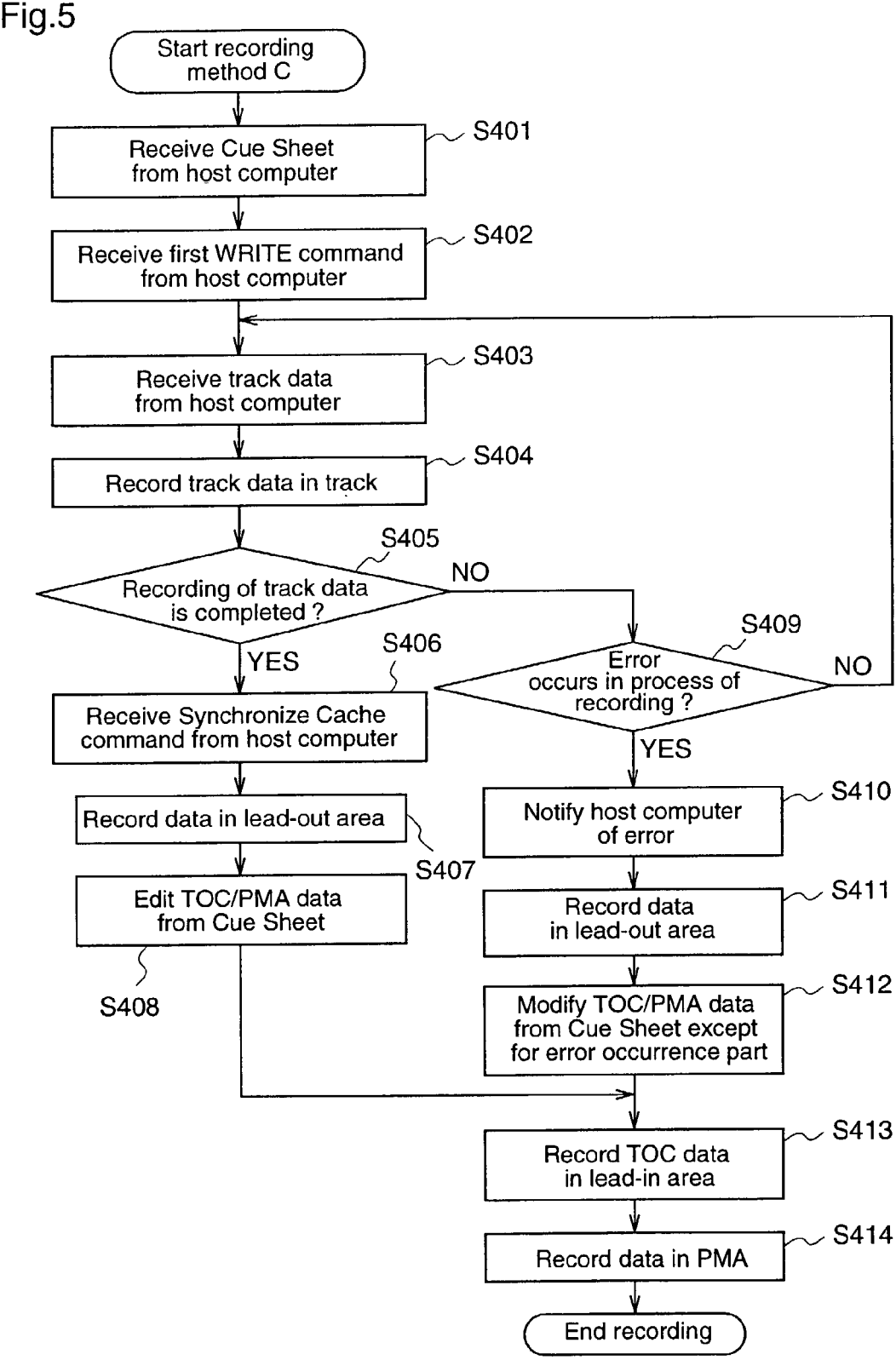
FIG. 5 is a flowchart explaining a recording method C in a case where an error occurs while a drive records track data by the recording method B, and then the recording process is suspended, in the first embodiment.

FIG. 5 is a flowchart for explaining a recording method C, in a case where the drive selects the recording method B from the above-described two recording methods and an error occurs while track data is recorded, in the first embodiment.

In the flow shown in FIG. 5, since the process in steps S401 to S408 are equivalent to those in steps S301 to S308 in FIG. 4, descriptions thereof will be omitted.

The drive 1 checks the presence or absence of an error (step S409) while recording track data in step S404. When an error occurs, the drive 1 aborts the recording of the track data, notifies the host computer 2 of the error (step S410), and records data in the lead-out area 53 (step S411). After the recording of data in the lead-out area 53 is completed, the control part 18 reedits TOC data and PMA data which have been created from the Cue Sheet, according to the state of the track data which is actually recorded on the disk 10 (step S412).

The TOC data reedited in the step S412 is shown in FIG. 8.

The original TOC data created from the Cue Sheet is shown in FIG. 7. For example, when an error occurs before recording data on track 4, recording for tracks 4 and 5 is not performed, and thus the TOC data comprises data of tracks 1 to 3 as shown in FIG. 8. Though not shown, PMA data which is obtained by similarly deleting the data on the tracks 4 and 5 from the original PMA data is created.

Finally, the reedited TOC data and PMA data are recorded in the lead-in area 51 and the PMA 50, respectively (steps S413 and S414).

Therefore, even when an error occurs while the track data is recorded, a relationship between the track data which is actually recorded on the disk 10, and the TOC data as well as the PMA data is normally maintained, thereby enabling reproduction of the track data. However, since the method for recording the whole data on the disk 10 at a time is originally adopted, no more data can be additionally recorded on the disk 10. Then, in step S412, the TOC data is reedited as shown in FIG. 9 so as to enable additional recording on the disk 10.

In the TOC data shown in FIG. 9, the track data part is the same as that in FIG. 8, while MODE 5 information of POINT B0 and POINT C0 is added to modify the TOC data to enable multi-session. The POINT B0 is information corresponding to the address of the lead-out area 53 of the disk 10 or the start address of the subsequent session in which data can be additionally written. The POINT C0 is information corresponding to the start address of the lead-in area 51 of the disk 10 or an optimum Power. Since either information is previously recorded on the disk 10 as ATIP (Absolute Time in Pre-groove) data, the drive 1 can read this information from the disk 10 on its own terms to create the TOC data in FIG. 9.

In step S413, the TOC data which is reedited for multi-session is recorded in the lead-in area 51, thereby enabling to write data on the disk 10, so that the remaining area of the disk 10 can be effectively utilized.

Embodiment 2

A second embodiment of the present invention will be described with reference to FIGS. 10 and 11.

Figure 10:
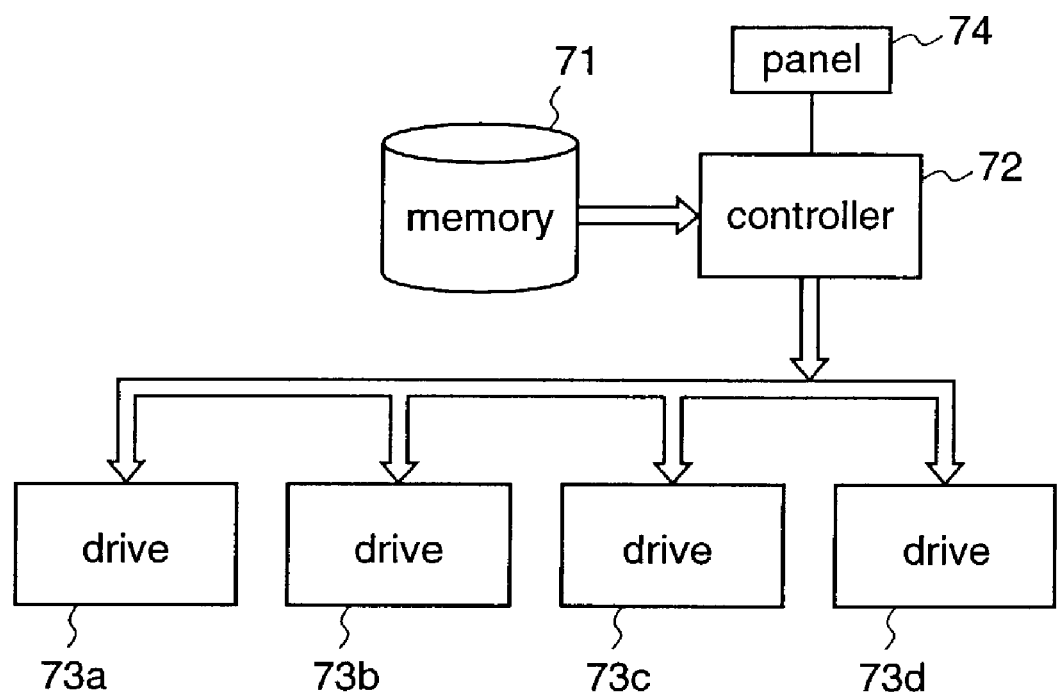
FIG. 10 is a block diagram illustrating the structure of a CD duplication system according to second and third embodiments of the present invention.

FIG. 10 is a block diagram illustrating the structure of a CD duplication system according to the second embodiment of the present invention.

Numeral 71 denotes a memory, numeral 72 denotes a controller for controlling recording and reproduction operations of plural drives 73a, 73b, 73c and 73d, and numeral 74 denotes a panel provided in the controller 72.

In the CD duplication system according to the present invention, the memory 71 serves as a data base, and data stored in the memory 71 is inputted to the controller 72 and, further, time-division transferred to all the drives 73a to 73d, so that the same data can be simultaneously recorded on discs in the respective drives 73a to 73d.

The drives 73a to 73d can carry out both of the conventional Disc At Once recording method A and the recording method B according to the present invention. The controller 72 can read ATIP (Absolute Time in Pre-groove) data of the discs inserted in the drives 73a to 73d.

Figure 11:
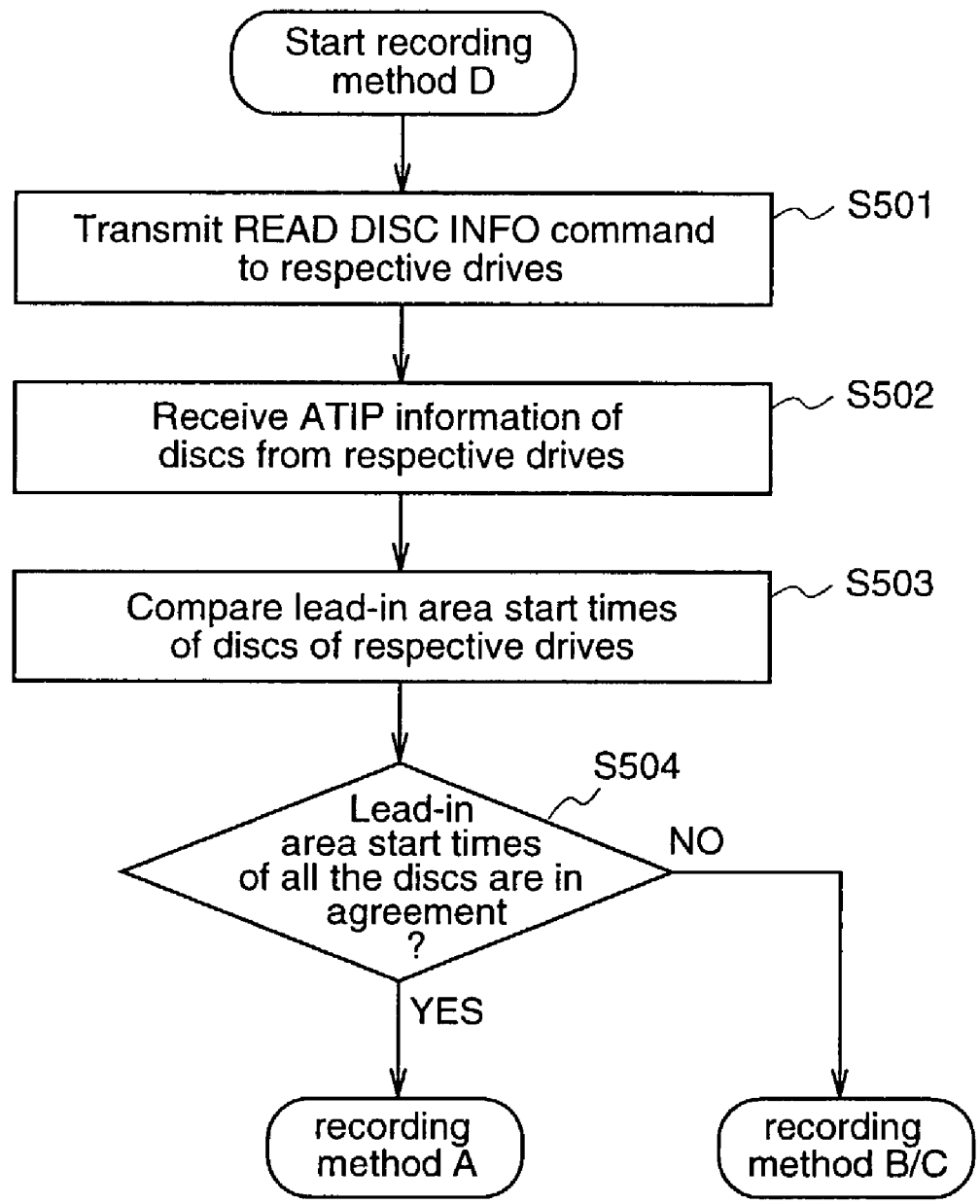
FIG. 11 is a flowchart for explaining a recording method D of the CD duplication system according to the second embodiment of the invention.

FIG. 11 is a flowchart for explaining a recording method D of the CD duplication system according to the second embodiment of the present invention.

In step S501, a READ DISC INFORMATION command is transferred from the controller 72 to the drives 73a to 73d. The READ DISC INFORMATION is a standard command defined by SCSI-3 MMC. Receiving the command, the respective drives 73a to 73d read the ATIP data from the ATIP of the discs, and send information on Disc Identification, lead-in area start time, and the like to the controller 72 (step S502).

The controller 72 compares the lead-in area start times of the discs in all the drives 73a to 73d with each other (steps S503 and S504). As the result of the comparison, when the lead-in area start times of all the discs are in agreement, the controller 72 instructs all the drives 73a to 73d to perform simultaneous recording with employing the Disc At Once recording method A.

When the lead-in area start times of all the discs are not in agreement, the lengths of the lead-in areas of the discs are different. Therefore, it is impossible to perform simultaneous recording on the discs by the Disc At Once recording method A because the respective drives 73a to 73d cannot get synchronization when the data for the track 1 are started to be transferred from the controller 72 to the respective drives 73a to 73d. Then, the controller 72 instructs all the drives 73a to 73d to perform simultaneous recording by the recording method B. Thereby, all the drives 73a to 73d can simultaneously record data on the plural discs with different lead-in area start times.

As described above, in the CD duplication system according to the second embodiment of the present invention, when the same data is simultaneously recorded on a large number of discs, there is no need to prepare the same type of discs, whereby an effective recording process can be carried out.

Embodiment 3

A third embodiment of the present invention will be described with reference to FIGS. 10 and 12.

Figure 12:
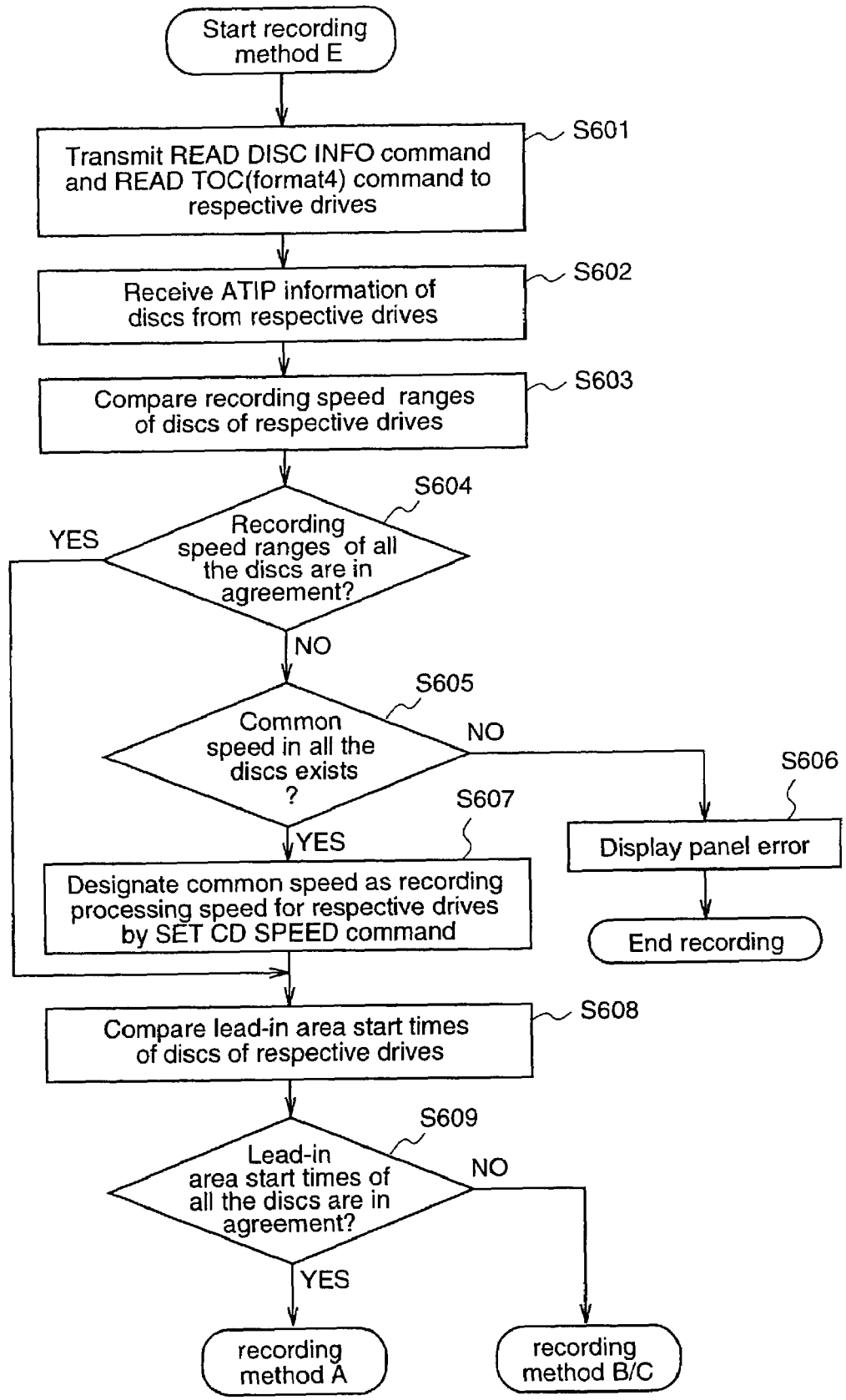
FIG. 12 is a flowchart for explaining a recording method E of the CD duplication system according to the third embodiment of the invention.

FIG. 12 is a flowchart for explaining a recording method E of a CD duplication system according to the third embodiment of the present invention.

In step S601, a READ DISC INFORMATION command and a READ TOC command are transmitted from the controller 72 to the drives 73a to 73d. The respective drives 73a to 73d which have received the READ DISC INFORMATION command read ATIP data of the discs and transmit the ATIP data to the controller 72 (step S602).

While a standard command defined by SCSI-3 MMC can be utilized as the READ TOC command, when format 4 of the READ TOC command is used, the controller 72 can extract more detailed ATIP information like disc recording speed information, from the drives 73a to 73d. In the case of CD-RW discs, the recording speed depends on the types of the discs, and there are discs of the recording speed ranges such as exclusively double speed, single to quadruple speed range, quadruple or more speed, and the like. The recording speed range of the CD-RW disc can be decided on the basis of Lowest Usable CLV Recording Speed, Highest Usable CLV Recording Speed, or Disc Sub-Type, among the ATIP information obtained by the READ TOC command (format 4).

The controller 72 obtains the recording speed ranges of the discs in all the drives 73a to 73d, and compares the recording speed ranges of all the discs with each other (steps S603 and S604). As the result of the comparison, when the recording speed ranges of all the discs are in agreement, the processing proceeds to step S608. When not in agreement, the processing proceeds to step S605.

In the step S605, a common speed in the recording speed ranges of all the disks is searched, and when there is no common speed, an error message is displayed on the panel 74 (step S606). When there is a common speed, the common speed is designated as a recording processing speed for all the drives 73a to 73d by a SET CD SPEED command defined by SCSI-3 MMC (step S607).

In the step S608, the controller 72 compares the lead-in area start times of all the discs in all the drives 73a to 73d with each other. When the lead-in area start times of all the discs are in agreement, the Disc At Once recording method A is selected, while when not in agreement, the recording method B is selected (step S609), thereby instructing all the drives 73a to 73d to perform simultaneous recording by the recording method A or B. Thereby, all the drives 73a to 73d can simultaneously record data on plural discs with different lead-in area start times or recording rate ranges.

As described above, the CD duplication system according to this embodiment of the present invention does not require the same type of discs when simultaneously recording the same data on a large number of discs, resulting in an effective recording process.

APPLICABILITY IN INDUSTRY

As described above, the optical disc recording control method, the drive, and the recording system according to the present invention enable to create an optical disc from which data can be reproduced even when an error occurs while data is being recorded in a track of the optical disc and then the recording process is suspended, and further an effective recording process can be performed even with different discs such as CD-Rs and CD-RWs.

The invention claimed is:

1. An optical disc recording control method by which data which is to be included in at least one track, a lead-in area, and a lead-out area of an optical disc is collectively recorded, comprising:

starting to record data from a pre-gap in a first track at an inner radius of the optical disc, continuously recording data in all the tracks and the lead-out area, and thereafter recording data in the lead-in area and a program memory area which are located at the inner radius of the first track;

wherein when an error occurs and the recording process is suspended while data is being recorded in the track of the optical disc, the recording process is switched to record data in the lead-out area, and after the recording in the lead-out area is ended, track information for reading the track data from the optical disc is modified in accordance with the track data which has been actually recorded on the optical disc, and the modified track information is recorded in the lead-in area and the program memory area.

2. An optical disc recording control method by which data which is to be included in at least one track, a lead-in area, and a lead-out area of an optical disc is collectively recorded, comprising:

starting to record data from a pre-gap in a first track at an inner radius of the optical disc, continuously recording data in all the tracks and the lead-out area, and thereafter recording data in the lead-in area and a program memory area which are located at the inner radius of the first track;

wherein when an error occurs and the recording process is suspended while data is being recorded in the track of the optical disc, the recording process is switched to record data in the lead-out area, and after the recording in the lead-out area is ended, track information for reading track data from the optical disc is modified in accordance with the track data which has been actually recorded on the optical disc, and the modified track information is recorded in the lead-in area and the program memory area, as well as multi-session information which enables additional recording on the optical disc is recorded in the lead-in area.

3. An optical disc drive for collectively recording data which is to be included in at least one track, a lead-in area, and a lead-out area of an optical disc, comprising:

a track data recording means for starting to record data from a pre-gap of a first track at an inner radius of the optical disc, and recording data in all the tracks;

a lead-out area recording means for recording data in the lead-out area continuously after the data is recorded in all the tracks;

a track information recording means for recording track information for reading the track data recorded on the optical disc, in the lead-in area and a program memory area which are located at the inner radius of the first track, after the data is recorded in the lead-out area;

a switching means for switching the recording process to record data in the lead-out area when an error occurs and the recording process is suspended while the track data is being recorded by the track data recording means;

a track information modification means for modifying the track information on all track data in accordance with the track data which has been actually recorded on the optical disc, after the recording process for the lead-out area by the lead-out area recording means is completed; and a second track information recording means for recording the track information modified by the track information modification means in the lead-in area and the program memory area.

4. An optical disc drive for collectively recording data which is to be included in at least one track, a lead-in area, and a lead-out area of an optical disc, comprising:

a track data recording means for starting to record data from a pre-gap of a first track at an inner radius of the optical disc, and recording data in all the tracks;

a lead-out area recording means for recording data in the lead-out area continuously after the data is recorded in all the tracks;

a track information recording means for recording track information for reading the track data recorded on the optical disc, in the lead-in area and a program memory area which are located at the inner radius of the first track, after the data is recorded in the lead-out area;

a switching means for switching the recording process to record data in the lead-out area when an error occurs and the recording process is suspended while the track data is being recorded by the track data recording means;

a track information modification means for modifying the track information on all track data in accordance with the track data which has been actually recorded on the optical disc, after the recording process for the lead-out area by the lead-out area recording means is completed;

a second track information recording means for recording the track information modified by the track information modification means in the lead-in area and the program memory area; and a multi-session information recording means for recording multi-session information which enables additional recording on the optical disc, in the lead-in area, while simultaneously the second track information recording means is recording the track information in the lead-in area and the program memory area.

* * * * *